(12) United States Patent
Theorell et al.

(10) Patent No.: US 7,398,771 B2
(45) Date of Patent: Jul. 15, 2008

(54) DEVICE FOR HEATING

(75) Inventors: Gunnar Theorell, Lerum (SE); Sigurd Sonderegger, Askim (SE)

(73) Assignee: Volvo Lastvaghan AB, Gothenburg (SE)

( * ) Notice: Subject to any disclaimer, the term of this patent is extended or adjusted under 35 U.S.C. 154(b) by 49 days.

(21) Appl. No.: 11/421,811

(22) Filed: Jun. 2, 2006

(65) Prior Publication Data

US 2006/0213473 A1    Sep. 28, 2006

Related U.S. Application Data

(63) Continuation of application No. PCT/SE2004/001809, filed on Dec. 3, 2004.

(30) Foreign Application Priority Data

Dec. 4, 2003    (SE)    .................... 0303276

(51) Int. Cl.
    *F02M 27/00*    (2006.01)
(52) U.S. Cl. ................ 123/557; 123/196 AB; 60/303
(58) Field of Classification Search ........... 123/196 AB, 123/542, 556, 546, 557, 545, 1 A, 198 A; 60/286, 295, 303
See application file for complete search history.

(56) References Cited

U.S. PATENT DOCUMENTS

| 4,237,850 | A | * | 12/1980 | Connor et al. | ............. 123/557 |
| 4,726,346 | A | * | 2/1988 | Lucht | ........................ 123/557 |
| 4,865,005 | A | * | 9/1989 | Griffith | ........................ 123/546 |
| 5,662,090 | A | * | 9/1997 | Ward | ........................... 123/557 |
| 2002/0108605 | A1 | * | 8/2002 | DeGrazia et al. | ............. 123/538 |
| 2003/0101713 | A1 | | 6/2003 | Huthwohl | |
| 2005/0235945 | A1 | * | 10/2005 | Ryczek et al. | ........ 123/196 AB |
| 2007/0079599 | A1 | * | 4/2007 | Osaku et al. | ................... 60/283 |
| 2007/0199308 | A1 | * | 8/2007 | Satou et al. | .................... 60/286 |

FOREIGN PATENT DOCUMENTS

| DE | 4417237 A1 | 9/1994 |
| DE | 4432576 A1 | 3/1996 |
| DE | 19729003 A1 | 2/1999 |
| DE | 19935920 A1 | 3/2001 |
| JP | 2000027627 | * 1/2000 |
| JP | 2005-291086 | * 10/2005 |

OTHER PUBLICATIONS

International Search Report from corresponding International Application PCT/SE2004/001809.
International Preliminary Examination Report from corresponding International Application PCT/SE2004/001809.

* cited by examiner

*Primary Examiner*—Hai H Huynh
(74) *Attorney, Agent, or Firm*—WRB-IP LLP

(57) ABSTRACT

A device for heating a first medium which is in liquid state and/or frozen state includes a reservoir disposed on an engine-driven vehicle and an element for heating the first medium present in the reservoir. The heating element is disposed inside the reservoir for direct heating of the first medium.

26 Claims, 3 Drawing Sheets

DEVICE FOR HEATING

The present application is a continuation of International Application PCT/SE2004/001809, filed Dec. 3, 2004, which claims priority to SE 0303276-0, filed Dec. 4, 2003, both of which are incorporated by reference.

BACKGROUND AND SUMMARY

The present invention relates to a heating device for heating a first medium which is in liquid state and/or frozen state.

In various kinds of vehicle there are reservoirs for liquids which are used for different functions of the vehicle. In certain cases there is a need to ensure that these liquids have a certain temperature to enable them to function as intended. The present invention can be applied in connection with the heating of liquids in various types of reservoirs for vehicle applications, but the following description will focus, for illustrative yet non-limiting purposes, on how the invention can be used to heat urea which is used to clean exhaust gases emanating from an internal combustion engine.

One way of satisfying the increasingly stringent requirements for the cleaning of exhaust gases emanating from internal combustion engines is to convert the exhaust gases into harmless or less harmful gases by the injection of an additive, such as urea.

The use of urea can serve, above all, to reduce the nitrogen oxides NOX content, thereby helping to cut emissions of harmful substances into the environment.

For this purpose, however, a continuous supply of urea is required whilst the internal combustion engine is running, which means that a vehicle, e.g., a truck, which is to utilize the cleaning technology in question is equipped with a reservoir for urea. Urea can then be supplied from the reservoir, for cleaning the exhaust gases.

There are, however, problems associated with the use of urea. In cold weather, for example, urea can freeze in the reservoir and/or in associated lines. If the urea freezes in the reservoir, this may mean, in turn, that urea cannot be provided as intended or that the urea which can be provided has a temperature which is unfavorable to the cleaning process or, in the worst case, that the reservoir is damaged as a result of frozen urea taking up a larger space than corresponding quantity of liquid urea.

It is desirable to provide a device for heating liquids, especially urea, in vehicle applications, which device allows such liquids to be used even where the ambient temperature is so low that the liquid is at risk of freezing in the reservoir and which device can be used to thaw the frozen liquid should the liquid have frozen.

According to an aspect of the present invention, a device for heating a first medium which is in liquid state and/or frozen state includes a reservoir disposed on an engine-driven vehicle and an element for heating the first medium present in the reservoir. The heating element is disposed inside the reservoir for direct heating of the first medium.

Positioning the heating element inside the reservoir for direct heating of the first medium, e.g., urea, allows an effective heating to be obtained at any chosen position in the reservoir.

In an advantageous embodiment of the invention, the heating element is configured as a coil for accommodation of a second medium to allow transfer of heat from the second medium to the first medium. It is especially advantageous to use as the second medium the liquid which is also used to cool the vehicle engine. By circulating coolant through the heating element, the first medium is heated, whilst, at the same time, the coolant temperature is able to be lowered, which in certain cases is beneficial. In this way, the first medium in the reservoir can therefore be supplied with heat from a heat source which, when the engine is running, is already available within the vehicle, this without the need to use any additional energy source, which, in turn, is a cost-effective way of attending to the heating of the first medium.

BRIEF DESCRIPTION OF THE DRAWINGS

A more detailed description of illustrative embodiments of the invention follows below with reference to the appended drawings, in which.

DETAILED DESCRIPTION

Figure 1:
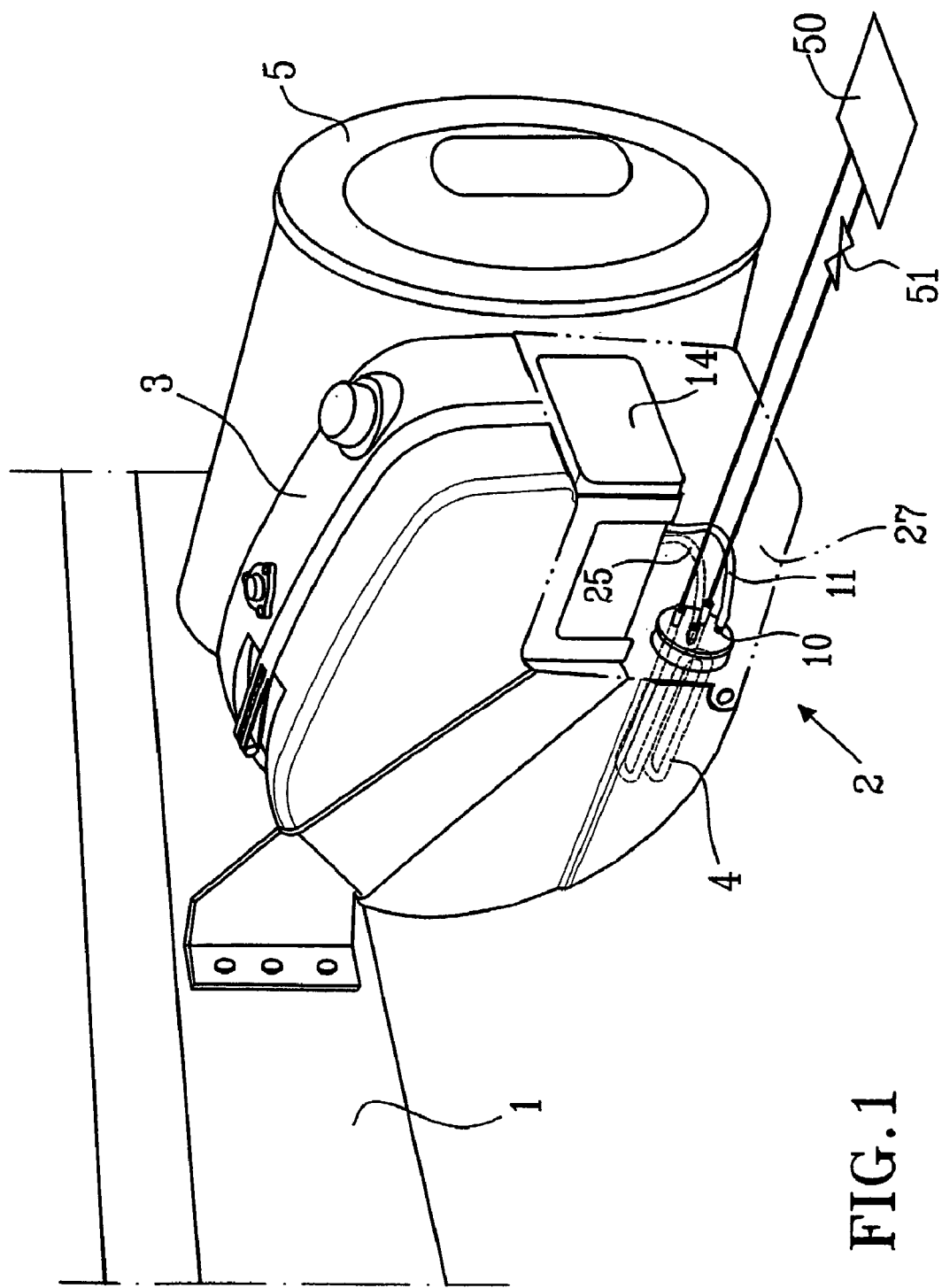
FIG. 1 is a perspective view illustrating a mechanism for, by means of urea, cleaning exhaust gases of an internal combustion engine, in which mechanism a device according to the invention is disposed for heating the urea.

FIG. 1 illustrates in a perspective view a mechanism for cleaning exhaust gases emanating from an internal combustion engine of a vehicle 1 by the admixture of a substance, such as urea. In the illustrated example, a device 2 according to the invention for heating a first medium, preferably urea, which is in liquid state and/or frozen state, constitutes a part of the mechanism. The device 2 comprises a reservoir 3 disposed on an engine-driven vehicle 1 and an element 4 for heating the first medium present in the reservoir 3. The reservoir 3 is expediently fastened to the chassis of the vehicle 1. It should be pointed out that the reservoir 3 can, of course, be placed on a vehicle unit which does not have an engine if this vehicle unit is engine-driven by being coupled to another vehicle unit which is provided with an engine.

The heating element 4 is disposed inside the reservoir 3 for direct heating of the first medium. It should be pointed out that by the term "direct" meant no other restriction than that such heating which is based on the fact that the first medium, hereinafter also referred to as urea or a solution consisting of or containing urea ($CO_2+H_2O$), is heated by the reservoir being heated by the heating element in order that the reservoir, in turn, shall then transfer heat to the first medium essentially does not take place or is of subordinate importance. This means that, according to the invention, the heating element 4 is instead arranged to transfer heat to the urea substantially by the heating element 4 being in contact with the urea or with the atmosphere surrounding the urea inside the reservoir 3.

From the reservoir 3, urea can be supplied to a combined muffler and catalyzer 5 in order to reduce the presence of nitrogen oxides in the exhaust gases emanating from the internal combustion engine (not shown) of the vehicle 1.

Figure 2:
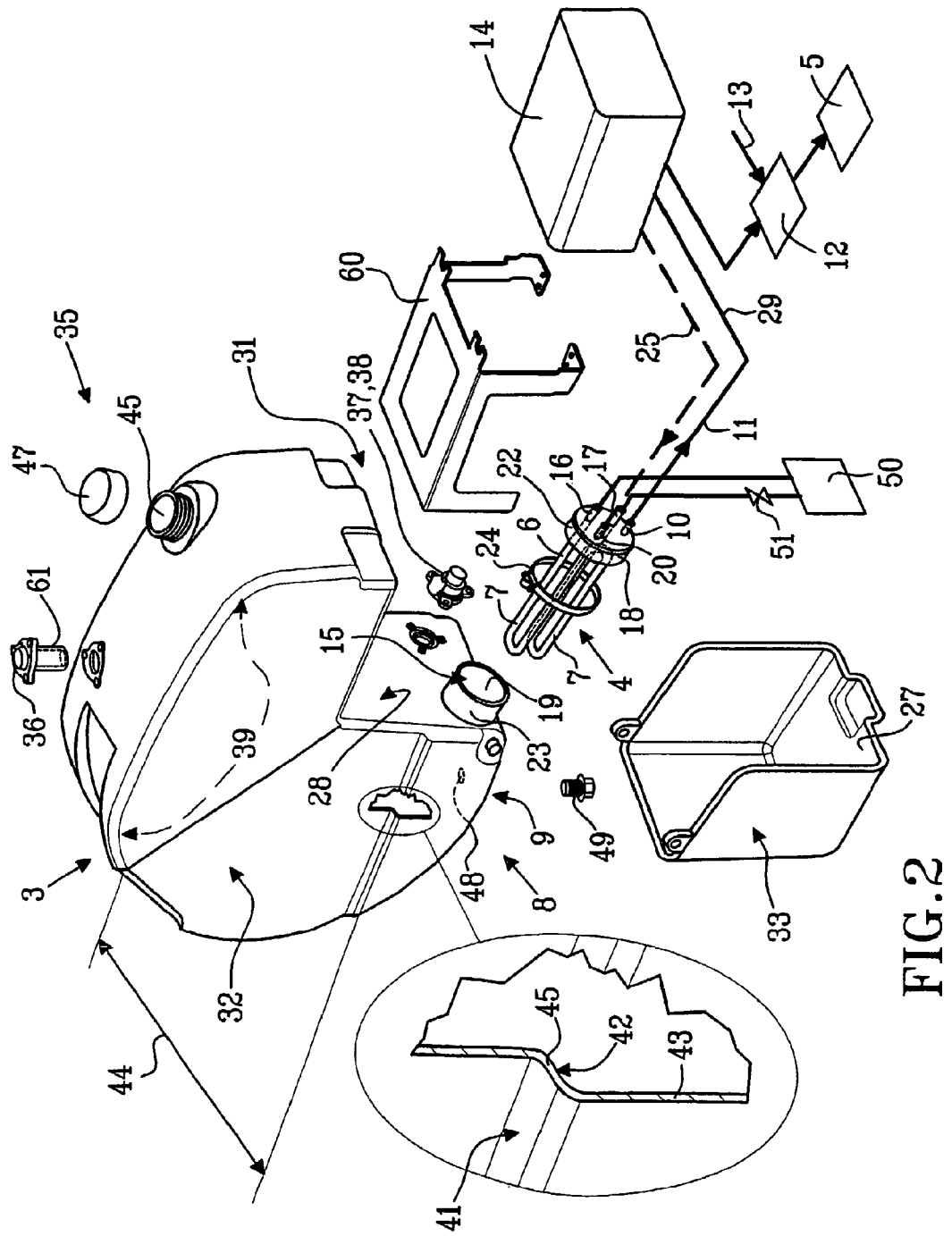
FIG. 2 is an exploded diagram of the device according to the invention.

As can be seen in greater detail from FIG. 2, in the illustrated embodiment the heating element 4 is configured as a coil 6 for accommodation of a second medium to allow transfer of heat from the second medium to the first medium. The coil 6, which can be made of, for example, a stainless steel tube, expediently comprises a few windings, in the example two loops 7, extending into the reservoir 3, in order to acquire a sufficiently large surface area for heat transfer. Note that in FIG. 2, which is an exploded diagram, the heating element 4 is depicted outside the reservoir 3 purely for reasons of clarity. As it is heated, the second medium can be continuously circulated by being made to flow from a heat source 50 (diagrammatically illustrated) through the heating element 4 and back to the heat source, and then on again to the heating element, etc. The flow through the coil 6 can be regulated by means of a solenoid valve 51 or the like. In an advantageous embodiment, the second medium is a liquid which is additionally used to cool the engine of the vehicle 1.

As can be seen from the illustrated embodiment, the heating element 4 is disposed in the lower part 8 of the reservoir 3, preferably essentially proximate to the bottom 9 of the reservoir. By lower part 8 of the reservoir 3 is meant a position below half the height of the reservoir or lower. Although the heating element 4 can, of course, be placed in other positions in the reservoir 3, an advantage of such a low placement of the heating element 4 is that the coil 6 is disposed in that part of the reservoir 3 in which the urea normally last freezes into a solid body. The reservoir 3, which, depending on the particular application, can have various sizes, but which often has a cubic capacity in the order of magnitude of 50-70 liters, can advantageously be rotation-molded from, for example, polyethylene or polypropylene or from a material with corresponding properties.

Furthermore, the reservoir 3 is provided with an outlet 10 and a line 11 for evacuating the first medium from the reservoir 3 to an additional unit 5 for use of the first medium. The additional unit 5 is expediently a catalyzer and/or a muffler disposed on the engine.

Before the urea reaches the additional unit 5, it can be pumped to a mixing and metering unit 12. Compressed air 13 can also be fed to the mixing and metering unit 12 to create an aerosol with suitable urea content, which aerosol can then be used to reduce the content in the exhaust gases. The reservoir 3 and the catalyzer and/or the muffler 5 are expediently disposed directly adjacent to one another, i.e., close together, so as to minimize the length of the line 11 which is to transfer the urea from the reservoir 3 to the catalyzer and/or the muffler 5.

In an advantageous embodiment, as illustrated, the heating element 4 is disposed, for heating of the first medium, close to the outlet 10 for evacuation of the first medium. This means that the greatest heat transfer from the coolant in the coil 6 to the urea will take place in the region in which the urea, expediently by means of a pump 14, see also FIG. 1, is sucked into the urea line 11 from the reservoir 3 for onward conveyance, for example to the mixing and metering unit 12. It is thereby ensured, as far as possible, that there is always liquid urea at the outlet 10 from the reservoir 3, so that the urea can be provided even if the urea in other parts of the reservoir 3 is frozen. Furthermore, the heating element 4 and the line 11 for evacuating the first medium from the reservoir can have essentially the same fastening position 15 in the reservoir 3.

Figure 3:
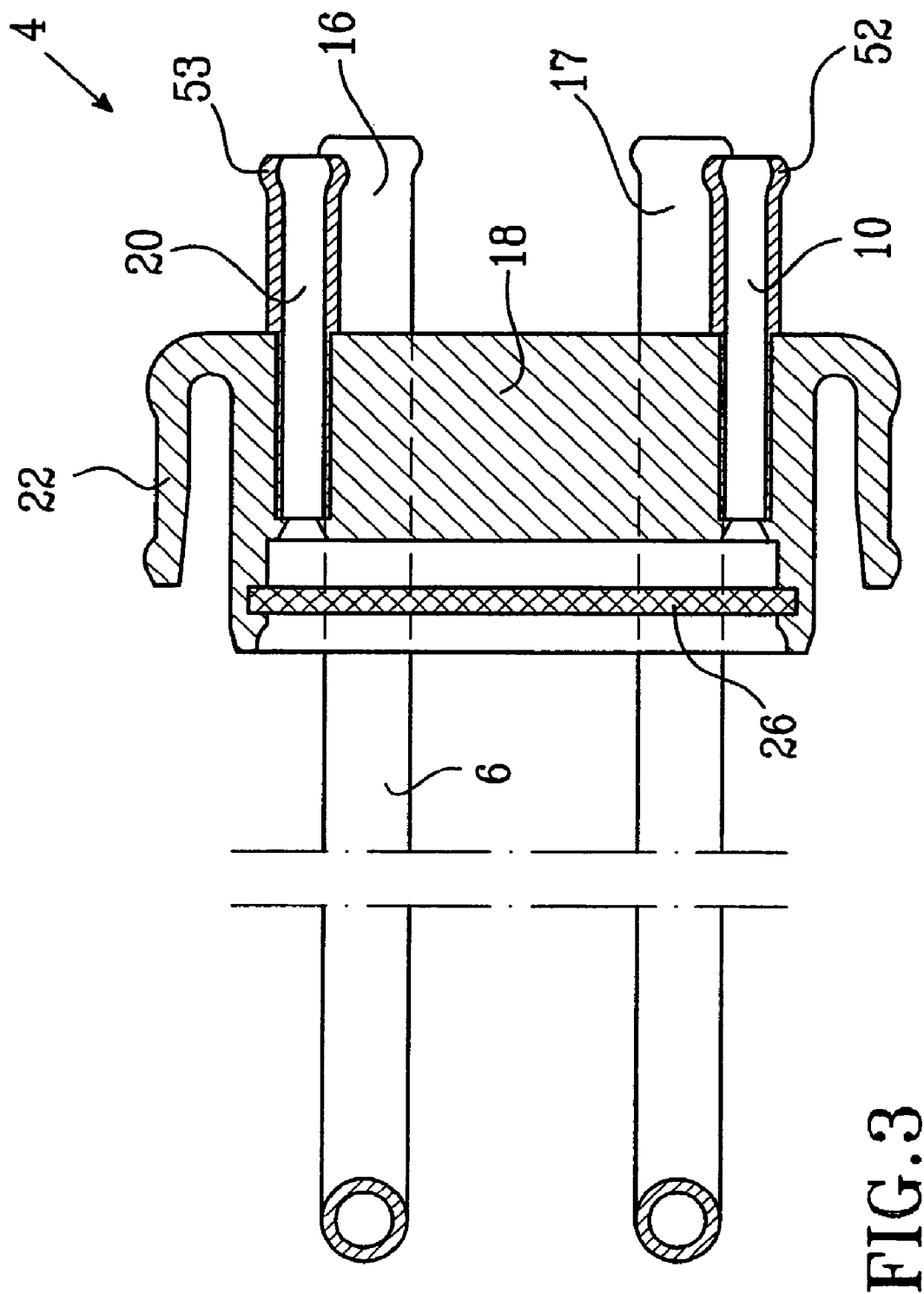
FIG. 3 is a side view of the heating element according to the invention.

As also illustrated in FIG. 3, not only the coil 6, but also two connections 16,17 belonging to the coil 6 for the introduction of coolant and evacuation of coolant respectively to/from the coil, and a connection 52 to the urea line 11 for evacuation of urea from the reservoir 3 are all disposed in a component 18. The connecting component 18, which preferably is made of rubber, is, in turn, disposed around an opening 19 in the reservoir 3, through which opening 19 the coil 6 can be introduced into the reservoir 3. In addition, an inlet 20 to the reservoir 3 and an associated connection 53 for the return of urea to the reservoir 3 are disposed in this component 18. The connecting component 18 expediently has a part configured as a ring 22, which is disposed on a flange 23 of the reservoir 3 and is fastened to the reservoir 3, for example by means of a hose clip 24. A return line 25 for urea can be used when the system is required to be emptied of urea, and the same compressed air source 13, and any valves used for the mixing and metering unit 12, can then expediently be used to return the urea to the reservoir 3, via the inlet 20, by means of compressed air. Alternatively, the same line 11 can be used to supply urea and also for the back-flushing of urea. In this case, the return line 25 can be omitted.

For evacuation of urea from the reservoir 3, a pump 14 is therefore expediently used. The pump 14 can be removably fastened to the reservoir 3 by means of, for example, a holder 60. Furthermore, a filter 26, made of, for example, polyethylene, is expediently disposed at the outlet 10 of the reservoir 3 so that the urea can be filtered before it is pumped to the mixing and metering unit 12. The placement of the filter 26 can be clearly seen from the partially cut side view in FIG. 3, which illustrates the heating element 4. The filter 26 is expediently integrated in the connecting component 18 and the filter 26 can be of the same order of magnitude as the opening 19 in the reservoir 3, i.e., the filter 26 can cover, in addition to the outlet port 10, also the return port 20. This means, in turn, that the return port 20 can be used to flush clean the filter 26, if so desired. FIG. 3 also shows the rubber connecting component 18 provided with the two coolant connection fittings 16,17 for the introduction and evacuation of coolant respectively to and from the coil 6, and provided with the two connection fittings 52,53 for the evacuation and back-flushing of urea respectively from and to the reservoir 3.

As can be seen from FIG. 2, the device, in an advantageous embodiment thereof, is provided with a cover 27, which, together with a part of the outer face 28 of the reservoir 3, encloses that part 29 of the line 11 which is disposed between the reservoir 3 and the pump 14 for evacuation of the first medium from the reservoir 3 via the outlet 10 to the additional unit 5. With such a design, the first medium is able successfully to maintain essentially the same temperature in this line part 29 between the reservoir 3 and the pump 14 as in the reservoir 3. Furthermore, the cover 27 can be arranged so as, together with the outer limit face 28 of the reservoir, also to enclose the pump 14, so that the temperature of the urea in the system comprising the reservoir 3, the line 29 between the reservoir and the pump, and the pump 14 is essentially the same throughout the system. In the illustrated example, the cover 27 can be arranged so as, together with a part of the outer limit face 28 of the reservoir, to enclose the fastening position 15 for the heating element 4 and the connections for urea and coolant. The cover 27 can advantageously be provided with insulating material. The urea line 11 for conveying urea from the pump 14 to the additional unit 5 can be a rubber hose, electrically heated by means of, for example, conventional heating coils disposed within the walls of the hose.

The illustrated configuration of the reservoir 3, which, together with the cover 27, has an essentially rotationally symmetric shape, in which the reservoir 3 has an indentation 31 in the lower part suitable for the fitting of peripheral equipment, such as the pump indentation is covered by the cover 27, represents a space-saving way of arranging this peripheral equipment. Although other embodiments are, of course, possible within the scope of the invention, this indentation 31, when the reservoir 3 is viewed in a direction perpendicular to any one of the side faces 32 of the reservoir, is in the order of magnitude of one-quarter of the total side face exhibited by the reservoir and the cover 27 combined, and the side face 33 of the cover 27 can further have a shape essentially corresponding to a 90° sector of a circle.

Adjacent to the mixing and metering unit 12 and/or the additional unit 5, a temperature transducer can be disposed for measuring the temperature of the urea. The urea is heated by means of the heating element 4 to a temperature at least exceeding the melt temperature for the first medium. If urea is used, the temperature should be at which is the melt temperature for urea, or higher, to enable urea to be provided in the manner intended. Moreover, the temperature of the urea should not exceed a predefined temperature, since the chemical properties of the urea are altered with increasing temperature.

In the upper part 35 of the reservoir 3, the reservoir is provided with one or more openings 36 such that the pressure of the atmosphere in the unfilled upper part 35 of the reservoir is essentially equal to the atmospheric pressure prevailing immediately outside the reservoir. Together with these openings 36 there is arranged a non-return valve 61, which acts firstly as a splash guard and secondly as a ventilating valve together with the openings 36. Furthermore, it is often of importance to be able to establish the level of urea which is present in the reservoir 3 and, by ensuring that the ambient atmospheric pressure also prevails in the upper part 35 of the reservoir, a pressure transducer 37 can be used to determine the level in the reservoir 3. The device therefore comprises a transducer 37, disposed in the reservoir, for measuring the pressure in the reservoir 3 in order, based on such a pressure measurement, to establish the level of the first medium in the reservoir 3. By measuring the pressure at a given level in the reservoir 3 and by knowing the pressure in the reservoir above the urea, it is possible to determine the current level of the urea by means of calculations. Preferably, the pressure transducer 37 is disposed in the lower part 8 of the reservoir, for example essentially proximate to the bottom 9 of the reservoir. A temperature transducer 38 can also be arranged together with or close to the pressure transducer 37 so as to be able to obtain information on the current temperature of the urea.

If the urea freezes, it will expand. The expansion is in the order of magnitude of and means that the reservoir 3 cannot be fully filled with liquid urea, since the reservoir will then be at risk of bursting in cold weather. On the other hand, as small as possible a reservoir 3 is desired, of course, for space reasons, whilst, at the same time, it should be able to be filled as much as possible in order to minimize the number of filling occasions.

In order to optimize the reservoir in this regard, an inner limit face 39 in the upper part 35 of the reservoir 3 can have a shape which is matched to the expansion experienced by the first medium when it freezes, i.e., in order to minimize the unfilled space in the reservoir, which space is required prior to freezing in order, when freezing takes place, to receive the thereby increased volume of the first medium and save the walls of the reservoir from load.

To this end, the inner limit face 39 can have a shape which essentially corresponds to the shape assumed by the frozen part at the top of the first medium when the first medium freezes. Preferably, the inner limit face 39 has an essentially convex shape, since, upon freezing, the solid urea tends to form an upward-growing solid body with a convex limit face.

The device is also provided with a means 41 for reducing the effect upon the heating element 4 resulting from possible icing close to the heating element 4. By effect is meant, primarily, unwelcome movement of frozen matter close to the heating element 4, which might damage the heating element. The movement-inhibiting means 41 can comprise one or more offsets 42 inside the reservoir 3, disposed on the side walls 43 of the reservoir, in order to keep frozen matter below these offsets 42 and thereby prevent the frozen matter from moving in the reservoir 3. The movement of frozen matter in the direction upward in the reservoir 3 is thereby principally prevented. To this end, the lower part 8 of the reservoir 3, surrounding the heating element 4, has a somewhat greater width 44 than the rest of the reservoir. This means that if the urea in the lower part 8 of the reservoir 3 proximate to the heating element 4 were to freeze, the solid body which is formed in the lower part 8 of the reservoir and which is usually formed firstly along the walls 43 of the reservoir 3 will be detained by the counterstays 42 disposed along the reservoir. The counterstays or offsets 42 are obtained by the reservoir 3 having portions 45 in which the walls 43 of the reservoir extend essentially horizontally, i.e., essentially perpendicular to the rest of the side walls 43, at the transition between the larger width at the bottom and the smaller width at the top. Damage which might otherwise arise as a result of the frozen matter moving around in the reservoir 3 and thus affecting the coil 6 can thereby be avoided.

As a result of the heating element 4 being disposed in the reservoir 3 via a connecting component 18 which has greater flexibility than the reservoir 3 proximate to the opening 19, by which component 18 the heating element 4 is suspended in the reservoir 3, a certain movement of the heating element 4 within the reservoir 3 as a result of, for example, a lump or lumps of frozen urea moving in the reservoir and affecting the coil 6, can be permitted without damage to the fastenings. Preferably, the connecting component 18 is made of a material which can be bent and deformed to a relatively large extent, such as rubber or the like.

For example, so-called EPDM rubber can be used to obtain a flexible fastening of the heating element 4 in the reservoir 3.

In the upper part 35 of the reservoir 3 there is also a filling port 46 for receiving a filler gun, which port 46 can be opened and closed by means of a cap 47. In the bottom 9 of the reservoir 3 there is disposed an opening 48 for emptying of the reservoir 3. A drainage plug 49 is arranged for sealing of the opening during normal running. Furthermore, the device can be provided with various equipment of conventional sort for fastening the reservoir 3 to the vehicle.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

It should be stressed that the invention is not limited to embodiments of the invention which are herein described, but only by the following patent claims.

Once the inventive concept is known, a number of modifications within the scope of the invention will probably be evident to a person skilled in the art.

What is claimed is:

1. A device for heating a first medium which is in at least one of a liquid state and a frozen state, comprising a reservoir disposed on an engine-driven vehicle and an element for heating the first medium present in the reservoir, wherein the heating element is disposed inside the reservoir for direct heating of the first medium, the reservoir is provided with an outlet and a line for evacuating the first medium from the reservoir to an additional unit in which the first medium is used, and the heating element is disposed, for heating of the first medium, close to the outlet for evacuation of the first medium, wherein the heating element and the line for evacuating the first medium from the reservoir have substantially the same fastening position in the reservoir.

2. The device as claimed in claim 1, wherein the heating element is configured as a coil for accommodation of a second medium to allow transfer of heat from the second medium to the first medium.

3. The device as claimed in claim 2, wherein the second medium is a liquid which is additionally used to cool the engine of the vehicle.

4. The device as claimed in claim 1, wherein the heating element is disposed in the lower part of the reservoir.

5. The device as claimed in claim 4, wherein the heating element is disposed substantially proximate to the bottom of the reservoir.

6. The device as claimed in claim 1, wherein the first medium is a solution containing urea.

7. The device as claimed in claim 1, wherein the additional unit is a catalyzer and/or a muffler connected to the engine of the vehicle.

8. The device as claimed in claim 1, wherein the additional unit is a catalyzer and/or a muffler connected to the engine of the vehicle.

9. The device as claimed in claim 1, wherein the additional unit and the reservoir are disposed directly adjacent to one another.

10. The device as claimed in claim 1, wherein the heating element and the line for evacuating the first medium from the reservoir have substantially the same fastening position in the reservoir.

11. The device as claimed in claim 1, wherein the device is provided with a cover, which, together with an outer face of the reservoir, encloses a part of the line disposed between the reservoir and a pump for evacuating the first medium from the reservoir via the outlet to the additional unit, such that the first medium maintains substantially the same temperature in this line part as in the reservoir.

12. The device as claimed in claim 11, wherein the cover is arranged so as, together with the outer limit face of the reservoir, to enclose the pump.

13. The device as claimed in claim 11, wherein the cover is arranged so as, together with the outer limit face of the reservoir, to enclose the fastening position.

14. The device as claimed in claim 1, wherein the device is provided with means for inhibiting the effect upon the heating element resulting from unwelcome movement of frozen matter close to the heating element.

15. The device as claimed in claim 1, comprising at least one offset inside the reservoir for inhibiting the effect upon the heating element resulting from unwelcome movement of frozen matter close to the heating element.

16. The device as claimed in claim 15, wherein the at least one offset is disposed on at least one side wall of the reservoir, and is adapted to keep frozen matter below the at least one offset such that, in at least one direction, frozen matter is prevented from moving in the reservoir.

17. The device as claimed in claim 1, wherein the reservoir is provided with one or more openings in an upper part of the reservoir such that pressure of the atmosphere in an unfilled upper part of the reservoir is substantially equal to atmospheric pressure prevailing immediately outside the reservoir.

18. The device as claimed in claim 1, comprising a transducer, disposed in the reservoir, for measuring pressure in the reservoir in order, based on such a pressure measurement, to establish a level of the first medium in the reservoir.

19. The device as claimed in claim 18, wherein the pressure transducer is disposed in a lower part of the reservoir.

20. The device as claimed in claim 19, wherein the pressure transducer is disposed substantially proximate to a bottom of the reservoir.

21. A device for heating a first medium which is in at least one of a liquid state and a frozen state, comprising a reservoir disposed on an engine-driven vehicle and an element for heating the first medium present in the reservoir, wherein the heating element is disposed inside the reservoir for direct heating of the first medium, the reservoir is provided with an outlet and a line for evacuating the first medium from the reservoir to an additional unit in which the first medium is used, and the heating element is disposed, for heating of the first medium, close to the outlet for evacuation of the first medium, and a connecting component, the connecting component being disposed in an opening in the reservoir and having greater flexibility than the reservoir proximate to the opening, the heating element being suspended in the reservoir by the component.

22. The device as claimed in claim 21, wherein the connecting component is made of rubber.

23. A device for heating a first medium which is in at least one of a liquid state and a frozen state, comprising a reservoir disposed on an engine-driven vehicle and an element for heating the first medium present in the reservoir, wherein the heating element is disposed inside the reservoir for direct heating of the first medium, the reservoir is provided with an outlet and a line for evacuating the first medium from the reservoir to an additional unit in which the first medium is used, and the heating element is disposed, for heating of the first medium, close to the outlet for evacuation of the first medium, wherein an inner limit face in the upper part of the reservoir has a shape which is matched to the expansion experienced by the first medium when it freezes in order to minimize the unfilled space in the reservoir, which space is required prior to freezing in order, when freezing takes place, to receive a thereby increased volume of the first medium and save the walls of the reservoir from load.

24. The device as claimed in claim 23, wherein the inner limit face has a shape which substantially corresponds to a shape assumed by a frozen part at a top of the first medium when the first medium freezes.

25. The device as claimed in claim 24, wherein the inner limit face has a substantially convex shape.

26. The device as claimed in claim 23, wherein the inner limit face has a substantially convex shape.

* * * * *